Oct. 28, 1969 H. J. BACH 3,475,212
METAL CONDUCTOR COATED WITH NONLINEAR COPOLYESTER
BASECOAT LAYER AND POLYAMIDE-IMIDE OUTER LAYER
Filed May 12, 1967

INVENTOR
HENRY J. BACH

3,475,212
METAL CONDUCTOR COATED WITH NONLINEAR COPOLYESTER BASECOAT LAYER AND POLYAMIDE-IMIDE OUTER LAYER
Henry J. Bach, Mount Lebanon, Pa., assignor to Mobil Oil Corporation, a corporation of New York
Filed May 12, 1967, Ser. No. 643,007
Int. Cl. H01b 1/06; B44d 1/42
U.S. Cl. 117—218      14 Claims

ABSTRACT OF THE DISCLOSURE

Electrical conductors basecoated with thermoset nonlinear copolyesters are topcoated with a baked film of organic solvent-soluble polyamide polymer of trimellitic anhydride and organic polyisocyanate in order to enhance hydrolytic stability and Freon resistance. The copolyesters used for the basecoat are formed by the copolyesterification of a dicarboxylic acid with a diol and a polyhydric alcohol such as glycerin or trishydroxyethyl isocyanurate. Preferred dicarboxylic acids are terephthalic acid, isophthalic acid, benzophenone dicarboxylic acid, dicarboxylic acid diimides, and mixtures thereof. This provides a copolyester with residual acid groups which is preferably cured with alkyl phenolic-modified aminoplast resin and titanium ion.

---

Figure 1:
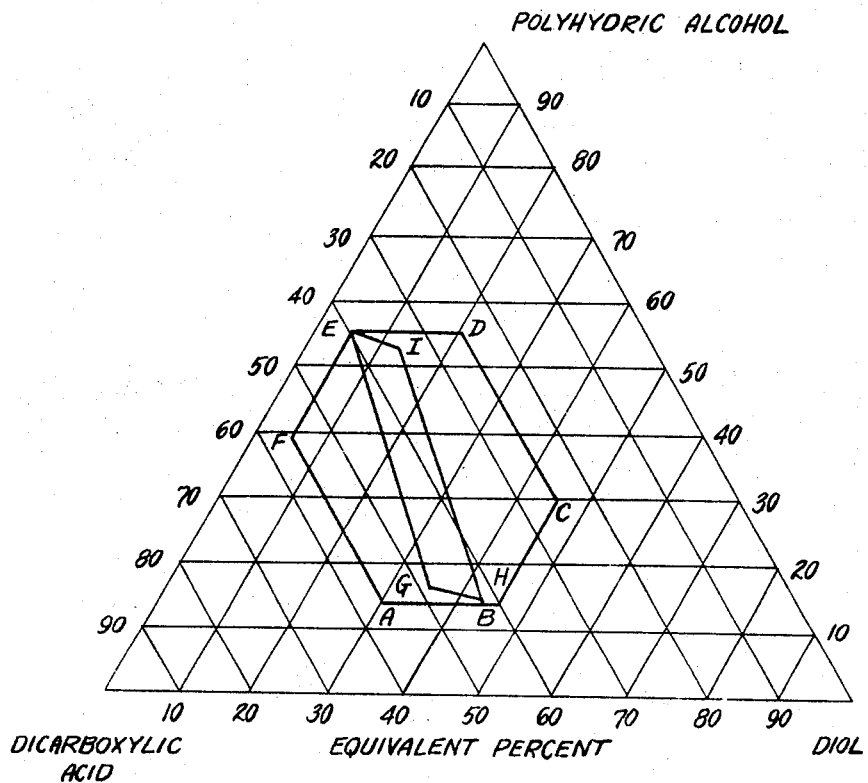

The present invention relates to the coating of wire, especially copper wire, and is especially concerned with basecoat-topcoat systems for containg wire intended to provide products of superior property.

In recent years, considerable strides have been made in the formulation of nonlinear thermosetting resins and wire enamels based thereon which have excellent resistance to elevated temperature and which are, therefore, of great value in the provision of insulated wire for motor armatures and like purpose. However, and while good resistance to elevated temperature has been obtained, the coatings have tended to crack when subjected to sudden changes in temperature (heat shock) and for this purpose the art has resorted to topcoats such as polyethylene terephthalate which resist sudden changes of temperature.

However, the better high temperature resisting nonlinear thermosetting basecoat materials tend to be inadequate in chemical resistance. Thus, and most important, hydrolytic stability is poor and Freon resistance is inadequate. It will be appreciated that electric motors are frequently used under circumstances in which high humidity and/or steam is likely to be encountered and, in many instances, electric motors are used in connection with air conditioning or refrigeration systems and Freon can be encountered in such utilities. Accordingly, in order to provide coated wire of greater merit, the hydrolytic stability and Freon resistance of the coatings used must be taken into consideration and the better non-linear thermosetting basecoat materials have proven to be inadequate in this area. Moreover, and while the conventional polyethylene terephthalate topcoats have enhanced the heat shock resistance of the basecoat, they have not been helpful in providing adequate hydrolytic stability or Freon resistance. Thus, when the polyethylene terephthalate topcoated materials are placed in a sealed tube containing water which is heated, the coatings tend to pop off the wire and it is an important purpose of the invention to provide appropriate topcoats which will enable the basecoat to resist this detrimental action. Similarly, and with the conventional polyethylene terephthalate topcoats, Freon attacks the coating and renders it unfit for use. Another important objective of the invention is to provide topcoats which enable the basecoat to resist being significantly affected by the Freon agents normally used in refrigeration and air conditioning systems.

In accordance with the invention, nonlinear thermosetting copolyesters are used to form the basecoat on the wire, these copolyesters being preferably applied in the form of an enamel in which the copolyester is in solution together with catalysts and agents which aid the final cure of the copolyester on the wire. In the invention, the copolyester is preferably based on a dicarboxylic acid component and the enamel includes titanium catalyst and alkyl phenol-modified aminoplast reaction products in order to provide basecoats having excellent resistance to high temperature exposure. Normally, the basecoat is formed by appying a plurality of layers and baking each layer to cure the same before the next layer of enamel is deposited. These basecoats are topcoated in the invention using polyamide/polyimide polymers which will be described more fully hereinafter and which provide in the combination defined the superior hydrolytic stability and Freon resistance which are desired in addition to protecting the basecoat from the adverse effects of sudden changes in temperature.

Referring first to the basecoats which are used, these are based on copolyesters which include three components, namely, dicarboxylic acid, diol and polyhydric alcohol (preferably containing three hydroxy groups per molecule). Broadly speaking, the proportions of the various components of the copolyester will fall within the closed area A–B–C–D–E–F–A in the accompanying triangulation, through in some instances it is particularly preferred to employ proportions falling within the closed area G–H–I–E–G. In any event, the copolyester is formed and combined with a metal catalyst, preferably a titanium catalyst, and also with an alkyl phenol-modified aminoplast resin in order that the nonlinear thermosetting copolyester can develop, when cured on the wire, the most desirable wire coating properties.

While the dicarboxylic acid component may be replaced by the corresponding dimethyl ester, this is not preferred, particularly when the polyhydric alcohol component comprises tris hydroxyalkyl isocyanurate. When using the acid terminated polyester, the use of titanium catalysts and alkyl phenol-modified materials is important to the development on the wire of the best physical and thermal properties.

The dicarboxylic acids which are useful are those which have the capacity of forming high molecular weight, cold-drawable homopolyesters with ethylene glycol. These are illustrated by terephthalic acid, isophthalic acid, benzophenone dicarboxylic acid, and dicarboxylic acid diimides, such as those formed by the reaction of two moles of tricarboxylic acid with one mole of diprimary amine. These can be used alone or in combination with one another and small mounts of other dicarboxylic acids can, less desirably, be present.

The diimides referred to above are illustrated by the reaction of two moles of trimellitic anhydride and one mole of methylene dianiline which yields the following dicarboxylic acid diimide:

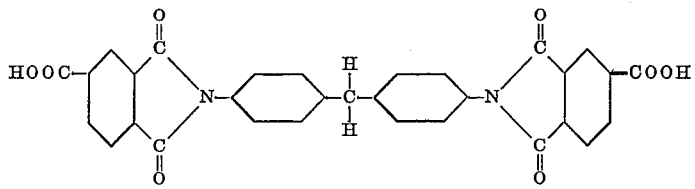

As can be seen from the structural formula, one mole of water must be eliminated for each mole of trimellitic anhydride used to provide the imide structure shown. If trimellitic acid were used in place of the anhydride, the same reaction would take place, but two moles of water would have to be eliminated for each mole of acid used.

While any diprimary amine may be used (the compound self-evidently cannot include any other functional group reactive with amine or carboxyl functionality), aromatic diamines and especially diaromatic diamines such as the methylene dianiline noted before are preferred. Other aromatic diamines are illustrated by paraphenylenediamine. Aliphatic diamines such as ethylenediamine are also useful.

At least tricarboxylic aromatic acids must be used in which two of the carboxylic acid groups are capable of forming an anhydride and, hence, capable of forming an imide. If the acid is higher than trifunctional, its functionality can be reduced to the desired trifunctionality by esterification with a monohydric alcohol or by amidization with a secondary amine.

The dicarboxylic acid diimides which may be used in the invention can also be formed by reacting aromatic dianhydrides or the corresponding tetracarboxylic acid, with a mono amino monocarboxylic acid in a mole ratio of substantially 1:2. A preferred tetracarboxylic acid is benzophenone tetracarboxylic acid preferably employed as the dianhydride. The mono amino acids which are preferred are those which have a carboxyl group on one end and an amine group on the other end. Typical examples are glycine (aminoacetic acid) or as aromatic acids aminobenzoic acid or amino salicylic acid.

The molar proportions noted should be observed within ±10%, preferably ±5%. While it is possible to isolate the dicarboxylic acid diimide prior to use, it is preferred to produce the diimide and then add the remaining components of the copolyester to the diimide reaction product without first modifying the reaction product in any way.

The second essential component of the copolyester is aliphatic diol containing from 2–10 carbon atoms. Various aliphatic hydrocarbon diols may be used, including cycloaliphatic diols, the preferred diol being ethylene glycol. 1,4-butane diol; 1,5-pentanediol; and 1,4-butene-2-diol illustrate other preferred diols for use alone or together with ethylene glycol. Other diols which may be used are illustrated by 1,2-propanediol; 1,3-propanediol; 1,6-hexanediol; 1,3-cyclobutanediol; 1,4-cyclohexanediol; 1,4-cyclohexane dimethanol, etc. The preferred diols are straight chain diols having from 1–5 carbon atoms and two primary hydroxy groups.

The third essential component of the copolyester is a polyhydric alcohol having at least three hydroxyl groups, such as glycerin; pentaerythritol; 1,1,1-trimethylolethane; 1,1,1,-trimethylolpropane; sorbitol, mannitol; dipentaerythritol; diglycerol, etc.

To emphasize the heat resistance of the polyester, it is preferred to employ as the polyhydric alcohol component, a trishydroxyalkyl isocyanurate which may be represented graphically by the formula:

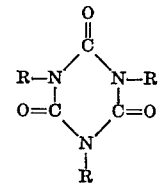

in which R represents an hydroxy alkyl radical containing at least two carbon atoms (i.e., 2-hydroxyethyl, $$-CH_2CH_2OH),$$

preferably two to four carbon atoms. The preferred isocyanurate is tris-2-hydroxyethyl isocyanurate. The isocyanurates and their production are more fully described in United States Patent No. 3,088,948, dated May 7, 1963, the disclosure of which is hereby incorporated by reference.

The utilization of trishydroxyalkyl isocyanurates in heat-resistant copolyesters including appropriate proportions of aromatic dicarboxylic acid and aliphatic diol containing from 2–10 carbon atoms is taught in the commonly owned copending application of Gerald P. Roeser, Ser. No. 313,934, filed Oct. 4, 1963, now U.S. Patent No. 3,390,131, the disclosures of which are hereby incorporated by reference.

The copolyesters of the invention consist essentially of the three components identified hereinbefore and the proportions of these components are critically interrelated. From the broad standpoint, the copolyesters consist essentially of:

(A) From 25–56 equivalent percent, preferably 35–49 percent of the defined dicarboxylic acids or their esters;

(B) From 6–46 equivalent percent, preferably 6–45 percent of the defined aliphatic diols; and (C) From 13–54 equivalent percent, preferably 15–54 percent of polyhydric alcohol, preferably trihydric alcohol.

The above broad indication of proportions is not wholly adequate to identify the components which are used in the invention and the only feasible way of defining proportions with best accuracy is by reference to a triangular graph. This technique has been adopted in the triangulation presented herewith in which the effective proportions in accordance with the invention are defined as falling within the closed area A–B–C–D–E–F–A and the preferred proportions as falling within the closed area G–H–I–E–G.

The term "equivalent percent" designates the percentage computed for each reactant in accordance with the formula:

Equivalent percent of reactant=

$$\frac{100 \times \text{equivalents of reactant}}{\text{Total equivalents}}$$

in which the number of equivalents of any reactant is normally determined by the number of moles of the reactant multiplied by the number of functional groups present in the reactant, e.g., two for the dicarboxylic acid and two for ethylene glycol.

The copolyester may be formed either by direct esterification or by transesterification, depending upon whether the dicarboxylic acid starting material is used in the acid or ester form.

When the copolyesters are prepared from dimethyl esters of dicarboxylic acids, the copolyesters are terminated with ester groups, e.g., methyl groups. It would appear that these methyl groups are stripped off upon high temperature exposure, providing an opening for thermal decomposition to proceed. Also, and when isocyanurates are used, far less decomposition is encountered when the copolyester is produced by direct esterification of the dicarboxylic acid and when proportions are confined within the preferred range G–H–I–E–G. This is quite surprising since transesterification with dimethyl terephthalate leads to extensive decomposition of the isocyanurate and since direct esterification of terephthalic acid, for example, requires more vigorous reaction conditions. Accordingly, the copolyesters of the invention are preferably produced by the direct esterification of the dicarboxylic acid diimide.

The copolyesters found to be useful in accordance with the invention have a specific viscosity (relative viscosity minus 1.0) measured at 77° F. in a 1 gram per deciliter solution in a solvent mixture containing 60 parts of phenol to 40 parts of tetrachloroethane in the range of from about 0.10–0.70. It has been found that from the standpoint of overall properties, it is preferred to employ copolyesters having a specific viscosity as indicated hereinbefore in the range of from 0.15–0.30.

Relative Viscosity is determined in an Ostwald-Fenske viscosimeter and is computed as follows:

Relative viscosity=

$$\frac{\text{Solution efflux time}}{\text{Solvent efflux time}}$$

The relative viscosity is thus obtained by direct measurement. Specific viscosity may be derived by substracting 1.0 from the relative viscosity.

The preferred copolyesters are desirably produced by a single stage reaction conducted in the presence of effective esterification catalysts at temperatures in the range of from 200 up to about 230° C. Of course, this excludes the production of the reactants, e.g., the preparation of the diimide diacid.

In accordance with the invention, the copolyesterification reaction is desirably continued until the acid number is lowered below about 30, preferably below 20.

In the presence of an effective esterification catalyst, illustrated by 0.25% by weight of total reactants of antimony trioxide, a reaction temperature in the range of 220–230° C. is preferred for periods of time up to about 7 hours.

The copolyester product is desirably provided in the form of a solvent solution, preferred solvents being alkylated phenols which are desirably used in the form of liquid mixtures. Various commercial mixtures are known to the art under the generic term of cresylic acid.

The production of a preferred copolyester is as follows:

EXAMPLE I

To a 3-liter, 3-neck resin flask equipped with an agitator in the center neck, a reflux column attached to one side neck and a charging flask attached to the other side neck and a heat source installed below the flask are charged 6 moles trimellitic anhydride (1152 grams), 3 moles methylene dianiline (594 grams), and 1638 grams N-methylpyrrolidone solvent. While under agitation, heat to reflux (310–360° F.) and remove 6 moles of water (108 grams). At this point, vacuum stripping of the solvent is started and the temperature is gradually increased to 400° F. A total of 86% of the solvent is removed under these conditions with the temperature gradually falling to 300° F. and the reaction mass becoming first a slurry and finally a solid. After removal of the 86% of the solvent (1410 grams), 1.8 moles of ethylene glycol (111.6 grams), 1.5 moles trishydroxyethyl isocyanurate (391.5 grams) and 5.1 grams antimony oxide (1% of the glycol plus isocyanurate charge) are added to the reaction flask and heating started again. The reaction is continued at 430° F. until 6 moles of water (108 grams) are removed and an acid number of <20 is obtained. Any solvent which comes off with the water of esterification is returned to the reactor or made up with an equivalent amount of fresh solvent. In this experiment 70 grams of solvent had to be added. After the desired acid number is obtained, 1200 grams of cresylic acid (Note 1) are added and the batch cooled. The resin solution is then discharged and adjusted to 31.7% solids using a 2/1 blend of cresylic acid/aromatic hydrocarbon solvent (boiling range 306–343° F.). The physical constants of the resin are:

Specific viscosity (Note 2) _____ 0.22
Acid number _____ 19.3
Hydroxyl value _____ 67.7
Total solids, percent _____ 31.7
Viscosity, cp.[1] _____ 548

[1] At 86° F. using Brookfield with #3 spindle at 60 r.p.m.

*Note 1.*—Solvent composition of (weight percent):

Phenol _____ 44
o-Cresol _____ 14
m-Cresol _____ 13
p-Cresol _____ 5
Mixed xylenols _____ 24

*Note 2.*—A sample is dissolved in 60/40 phenol/tetrachlorethane at a concentration of 1 gram per deciliter and the specific viscosity determined at 77° F.

It should be noted that properties other than mere resistance to elevated temperature are of importance to coated wire and it is desirable to maximize these properties, particular reference being had to the physical toughness of the coating.

For such purpose, the acid terminated copolyester is used in combination with alkyl phenolic-modified, organic solvent-soluble, heat-hardening aminoplast resin and the curing capacity of the mixture is enhanced by the presence of dissolved titanium ion, preferably in the form of a titanium cresylate. These cure uniquely to provide high temperature-resistant coatings of enhanced toughness.

The organic solvent-soluble, heat-hardening aminoplast resins which are used in accordance with the present invention form a well-known class of resinous materials which are formed by the reaction of a polyamine and particularly a triazine, notably melamine, with excess aldehyde, especially formaldehyde, and in the presence of an alcoholic solvent to provide organic solvent solubility, normally through at least partial etherification of the alkylol (methylol) groups of the resin by the alcohol solvent. Other polyamines are illustrated by urea, benzoguanamine and various triazines including dicyandiamide. Normally, the solvents contain at least 3 carbon atoms, butanol, ethoxy ethanol and 2-butoxyethanol being particularly common. The reaction may be conducted in acid, essentially neutral or in alkaline medium, as is well known.

These solvent-soluble, heat-hardening aminoplast resins are not adequate per se to desirably modify the preferred acid terminated copolyester and it is necessary to modify these by cooking the same with an alkyl phenol or mixture of alkyl phenols. Appropriate alkyl phenols are the various isomeric cresols, especially mixtures thereof and also the various isomeric xylenols and their mixtures with one another end with the various cresols. While cresols and xylenols are particularly preferred, other alkyl phenols may be used or may be present in admixture with the cresols and xylenols which are preferred. Halogen-substituted alkyl phenols may also be present, especially in minor amount (up to about 15% by weight of the total weight of alkyl phenol). While reliance is had upon the use of alkyl phenols, halogen-substituted phenols such as orthochloro phenol may be present, especially if the proportion thereof is kept small to minimize the corrosive influence of the chlorophenols. The preferred alkyl groups are $C_1$–$C_4$ alkyl groups, especially methyl groups. The alkyl phenol-modified aminoplast resin should be used in an amount of about 2–25% of the weight of the polyester, preferably from 4–12% by weight, said weight percentages being based on nonvolatile aminoplast resin solids prior to modification.

All that is required for the modification of the aminoplast resin with the alkyl phenol is that the two be cooked together thoroughly which causes a reaction to take place therebetween. The fact of reaction is easily noted by a reduction in the nitrogen content of the resin solids. A marked increase in the hydroxyl number of the product has also been noted as a result of the alkyl phenol cook. Cooking is facilitated by removing the lower boiling alcohols, such as butanol, with which aminoplast resins are normally associated, but this is not essential. The removal of butanol also improves the flow of the coating solution.

In view of the use of alkyl phenol aminoplast reaction products, the coating solutions made therefrom will naturally include an alkyl phenol component as an important part of the solvent system of the coating solution and, preferably, as a major weight component of the solvent phase thereof.

Dissolved titanium ion is desirably present as catalyst. Other metal ions such as aluminum, zinc and magnesium also exert a catalytic curing activity but these do not provide the uniquely superior properties which are provided by the titanium ion.

To maximize compatibility of the various components in the system, the dissolved titanium ion is preferably provided in the form of a titanium complex with the previously described alkyl phenols. Thus, the organic derivative of titanium with a mixture of cresols can be identified as a titanium cresylate. While titanium cresylates are preferred, they are not essential, though the cresylate form is quite important to prevent the acid terminated product from gelling when the catalyst is incorporated.

The titanium catalyst is desirably present in an amount (based on titanium metal) of at least about 0.1% of the weight of the copolyester to be cured, though it is preferred to employ proportions of at least about 0.2% up to about 1.5% of the catalyst. Particularly preferred proportions are from 0.3 to 0.8%. It is also preferred to interrelate the proportion of titanium catalyst with the proportion of aminoplast reaction product, a preferred weight ratio of aminoplast reaction product to titanium catalyst being from 20:1 to 3:1, from 15:1 to 5:1 being viewed as optimum. Again, the titanium content is based on the weight of metal and the aminoplast reaction product is conveniently measured by the weight of non-volatile aminoplast resin solids prior to modification by reaction with phenol.

EXAMPLE II

Formation of titanium cresylate

To a stainless steel kettle equipped with an agitator, a reflux condenser and a heating and cooling source, charge 60 pounds of a 50/50 phenol/o-cresol mixture, 20 pounds of tetrabutyl titanate and 20 pounds of an aromatic hydrocarbon solvent having a boiling range of 145–195° C. While agitating, heat to reflux (300–315° F.) within four hours and hold at reflux for thirty minutes. Cool to room temperature (80–90° F.) as quickly as possible—in less than one hour.

The intermediate thus prepared should be stored in airtight containers at temperatures above 60° F. and should be used within two months of manufacture.

EXAMPLE III

Modification of aminoplast resin with alkyl phenol

To a stainless steel kettle equipped with a agitator, a heating and cooling source, a distillate condenser-receiver- and a source of vacuum, charge 85 pounds of a cresylic acid and 15 pounds of a 66.7% solids solution of butylated heat-hardening melamine-formaldehyde resin. While agitating, heat to 273° F. and hold for five minutes at atmospheric pressure. While continuing to maintain the same heat input apply a vacuum to remove 25 pounds of solvent including any butanol introduced by the resin solution charged. This distillate is discarded and the remainder of the charge is cooled to room temperature and transferred to suitable containers for storage.

The cresylic acid referred to in this example contains the following components.

| Cresylic acid analysis: | Percent by wt. |
|---|---|
| Phenol | 10.1 |
| Ortho-cresol | 12.9 |
| 2,6-xylenol | 0.3 |
| Meta-paracresol | 27.9 |
| Ortho-ethylphenol | 1.1 |
| 2,4-2,5-xylenol | 15.9 |
| 2,3-xylenol | 19.6 |
| 3,4-xylenol | 7.0 |
| Alkyl-substituted phenols containing 9 carbon atoms | 5.2 |

The melamine-formaldehyde resin used in this example is made as follows:

521 grams of 40% solution of formaldehyde in isobutanol (contains about 7% of water) are charged to a two liter flask together with 72 grams of water and the mixture is adjusted to a pH of from 6.8–7.4 with sodium hydroxide. 187 grams of melamine and 293 grams of n-butanol are added and the mixture is heated to 70–80° C. in 20 minutes and is held at this temperature for 25 minutes. The temperature is then raised to about 99° C. at which point distillation occurs and the mixture is refluxed, the water being collected and the butanol being returned to the flask. After distilling for an hour and 20 minutes, 1 gram of 50% formic acid and 11 grams of n-butanol are added slowly over a 1 hour period and the distillation is continued for a total distilling time of 3½ hours. Vacuum is then applied and approximately 209 grams of butanol are removed by the vacuum application. At this point, the vacuum is removed and the product is thinned by the addition of approximately 96 grams of xylol to provide a solution product having a nonvolatile resin solids content of 66.7%.

Other aminoplast resins have successfully been used in place of the melamine-formaldehyde resin referred to above. Thus, there are many commercial organic solvent-soluble, heat-hardening melamine-formaldehyde resins and several of these were tested and found to be operable. Similarly, a commercial butylated triazine formaldehyde resin was used successfully, though the melamine resins are preferred. Butylated urea-formaldehyde resins were also checked and found to be useful.

It is of possible significance to note that a great degree of resinification is not necessary since commercial monomeric hexamethoxy hexamethylol melamine is useful.

EXAMPLE IV

The basecoat enamels of the invention are illustrated by cold blending the following:

| | Parts by wt. |
|---|---|
| Copolyester resin solution of Example I | 85.4 |
| Cresylic acid used in Example III | 2.3 |
| Aromatic hydrocarbon solvent (boiling range 145–195° C.) | 1.1 |

|                                                         | Parts by wt. |
| ------------------------------------------------------- | ------------ |
| Alkyl phenol-aminoplast resin reaction product of Example III | 5.5   |
| Titanium cresylate of Example II                        | 5.7          |

The last item is added slowly to the mixture of other items under agitation.

The production of a preferred copolyester based on terephthalic acid is as follows:

EXAMPLE V

In a 72-liter 3-necked flask equipped with a powerful stirrer through the center neck, a thermometer in one side well, and on the other side well a steam-heated 40 inch Allihn condenser leading to a water-cooled condenser and receiver for collecting the water of esterification, there are charged 2880 grams (46.5 moles) ethylene glycol, 9525 grams (36.5 moles) tris (2-hydroxyethyl)-isocyanurate, and 12,450 grams (75.0 moles) terephthalic acid. If catalyst is to be used, 62 grams (0.25%) of antimony oxide is added. The ingredients are heated with agitation to about 200° C. in ninety minutes. Water and glycol reflux in the steam jacketed condenser with the glycol returning to the pot and the water volatilizing over into the receiver. After 5 to 9 hours of heating, not exceeding 220–230° C. pot temperature, all the water of esterification which will develop is recovered (2575–2640 grams of 95.3–97.8% of theory). The acid value is checked by titrating a sample of the resin melt dissolved in pyridine with 0.01 N potassium hydroxide solution to the phenolphthalein end point. According to the OH/COOH ratio used, it can vary up to 30, but in the above batch is about 5.0. A sample of the melt is dissolved in 60/40 phenol/tetrachlorethane at a concentration of 1 gram per deciliter and the specific viscosity determined at 77° F. It may vary from 0.10 to 0.70 according to the OH/COOH ratio and final acid value selected. In this case it is 0.22. 22,215 grams of cresylic acid (see Note 1) are added to the hot resin and the solution discharged. Solids of the solution are determined, usually 51–53%, and a sample is diluted with 60/40 phenol/tetrachlorethane to a concentration of 1 gram per deciliter. Specific viscosity is again determined and comes out to 0.23.

This copolyester had a OH/COOH ratio of 1.35/1.00 and a theoretical nitrogen content of 6.91%.

EXAMPLE VI

The basecoat enamels of the invention are further illustrated by cold blending the following:

|                                                         | Parts by wt. |
| ------------------------------------------------------- | ------------ |
| Copolyester resin solution of Example V                 | 100          |
| Alkyl phenol-aminoplast resin reaction product of Example III | 5.3  |
| Titanium cresylate of Example II                        | 0.3          |

The proportions set forth above are in parts by weight of nonvolatile resin solids, the alkyl phenol-modified melamine resin being measured in parts by weight of nonvolatile resin solids prior to modification and the titanium catalyst being measured in parts by weight of titanium metal.

The coating solutions of the invention are desirably applied to aluminum or copper wire and baked as indicated hereinafter to provide heat-resistant coatings which are physically tough. While these have reasonably good properties without topcoating, conventional topcoating is still helpful, but hydrolytic stability and Feon resistance is not adequate as indicated previously.

The basecoats described hereinbefore are applied to wire in a plurality of separate coatings, each approximately ½ mil in thickness with each coating being baked prior to the application of the succeeding coating. Appropriate baking equipment for the wire is illustrated by a vertical tower having a 12 foot heating zone in an overall length of 15 feet. The temperatures within the oven range from 250° F. at the bottom to 800° F. at the top of the heating zone. The wire is moved through the tower at speeds of from 15–25 feet per minute.

To illustrate utilization of the two specific basecoats described hereinbefore, five coatings are applied successively to No. 18 AWG copper wire moving at 23 feet per minute through the tower already described to provide a total coating build of 2½ mils which is then overcoated with a topcoat to be described, thus increasing the total coating build to 3 mils.

Referring to the topcoat materials which provide Freon resistance and hydrolytic stability in the present invention, these are based on a polymer having predominately alternate amide and imide linkages and it is found that this provides good high temperature properties including resistance to heat shock as are needed for topcoating with minimum sacrifice in film flexibility as is required for good coated wire and the stability and Freon resistance needed are also supplied.

One procedure for producing the desired alternate amide and imide linkages is as follows:

*Step. 1.*—React trimellitic anhydride with an organic polyisocyanate, preferably a diisocyanate such as methylene diisocyanate:

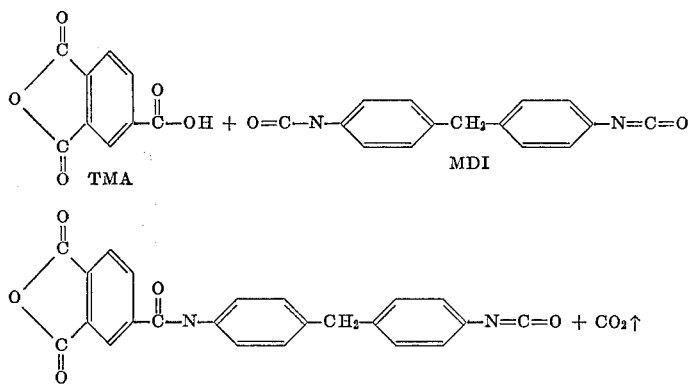

TMA/MDI ADDUCT

As can be seen, this intermediate product possess both anhydride and isocyanate functionaliities.

*Step 2.*—The adduct produced in 1 is reacted with phenol (mere cooking with mild heat) to block the same and produce:

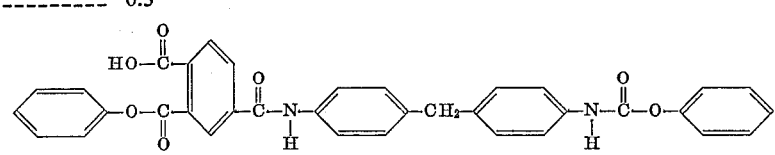

PHENOL-BLOCKED TMA/MDI ADDUCT

Any monofunctional blocking agent may be used as long as it is released (split off) at the reaction temperatures which are employed. In this respect, it is desired that the blocking agent be substantially completely released when the coatings are baked in the wire tower and it has been found that monohydric phenols are particularly effective in this regard. Typical phenols which may be used are illustrated by: phenol, meta-cresol, para-cresol, ortho-cresol and mixtures thereof, the xylenols, e.g., 2,6-dimethylphenol, 4-ethylphenol, 4-tertiary-butylphenol, 2-butylphenol, 4-n-octylphenol, 4-isoctylphenol, 2-chlorophenol, 2,6-dichlorophenol, 2-nitrophenol, 4-nitrophenol, and 3-nitrophenol. On the other hand, there are numerous other monofunctional blocking agent which are well known and which, while not as effective as the phenols noted above are, nonetheless, useful. Innumerable compounds falling within this class are well known and illustrated in United States Patents 2,723,265 and 2,982,754.

*Step. 3.*—On heating the phenol blocked adduct at 130° C. the phenol from the NCO group is removed and becomes a part of the solvent and carbon dioxide is liberated as follows to produce a solvent-soluble polyamide polymer:

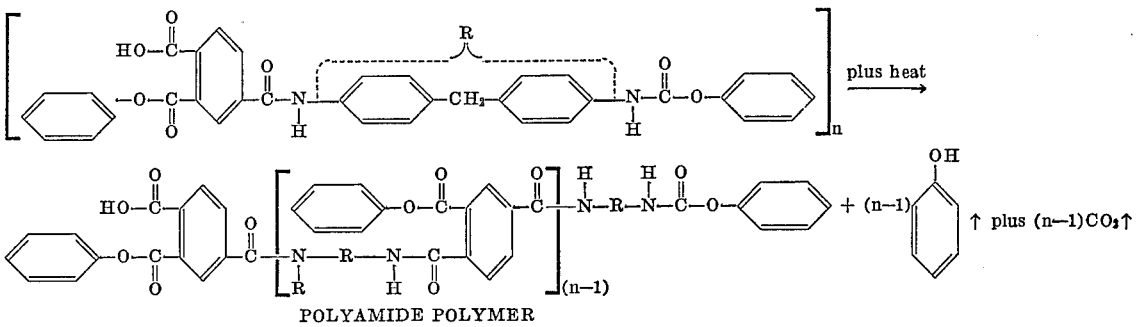

POLYAMIDE POLYMER

*Step 4.*—This polyamide polymer is insolubilized primarily by imide formation which takes place when further phenol is liberated during the final baking operation which takes place in the wire tower. In this fashion, the polyamide polymer pictured above is converted to a polymer having alternate imide and amide groups having the following structure:

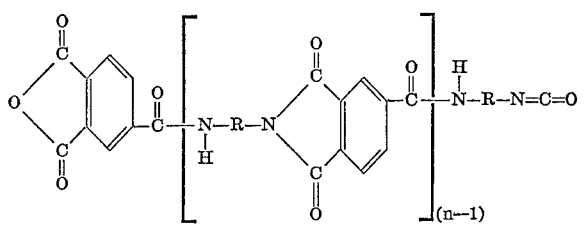

The end groups in the above formula are idealized. Moreover, and while the above structure shows the imide formation, there is also some incidental polymer growth during the baking operation as will be evident from the existence of reactive groups.

The mol ratio of trimellitic anhydride to polyisocyanate, preferably diisocyanate should be between 1/0.95 to 1/1.4, preferably from 1/0.97–1/1.3. When too little diisocyanate is used, e.g., a ratio of 1/0.90, the polymer lacks flexibility and adhesion. When too much diisocyanate is used, e.g., more than a ratio of 1/1.4, numerous properties fail, e.g., failures from heat shock, lack of flexibility and lack of toughness are all encountered.

From the standpoint of the chemistry involved, when the mole ratio of reactants is substantially 1/1, which is preferred, the product after final baking appears to consist essentially of alternate amide and imide linkages. As will be evident, as one departs from the preferred equimolar ratio, all of the linkages are not alternating amide and imide linkages, but these alternating linkages are still predominant to supply the desired new properties in combination.

Trimellitic anhydride has no known equivalents in the present development. Even the acid chloride form or the acid form of the same compound do not react in the desired order.

Equivalents for the preferred methylene diisocyanate are toluene diisocyanate, hexamethylene diisocyanate, meta phenylene diisocyanate, polymethylene polyphenyl isocyanate, diaminidine diisocyanate, bis-2-isocyanatoethyl-fumarate, bis-2-isocyanate-ethyl-carbonate, and bis-2 - isocyanate-ethyl-1-1-1,4,5,6,7,7 - hexachloronorborn-5-ene-2,3-dicarboxylate.

The preferred polyisocyanates are aromatic and, with the exception of the isocyanate groups, consist of atoms selected from the group consisting of carbon, hydrogen, and halogen atoms, the halogen atoms being optional.

EXAMPLE VII

To a suitable reaction vessel equipped with an agitator, a charging port, a reflux condenser, a thermometer well and a heat source, there are charged 431 parts by weight of N-methylpyrrolidone and 169 parts by weight of methylene diisocyanate (MDI). While under agitation, the mixture is heated to 195° F. to dissolve the MDI and 130 parts of trimellitic anhydride are added. The temperature is then raised to 255° F. and an exothermic reaction occurs. At the completion of the exotherm, the temperature is further increased to 275° F. and this temperature is maintained until a total of 29.8 parts by weight of carbon dioxide is liberated. The reaction mixture is then cooled to 255° F. and 127 parts of phenol are added. The temperature is again raised to 275° F. and held at 275° F. until a room temperature sample of the reaction medium has a viscosity in the range of approximately 6000–10,000 centipoises using a Brookfield viscosimeter. When the desired viscosity is obtained, the reaction mass is cooled to 240° F. and 143 parts by weight of Solvesso 100 are added (mixture of aromatic hydrocarbon solvents having a boiling range of from 306 to 343° F.).

There is thus produced a ready-for-use wire enamel formulation having a total determined solids of 30.5% and a viscosity of 3300 centipoise at 86° F. The solids determination is made using a 0.5 gram sample baked 40 minutes at 340° F.

When the above wire enamel formulation, which has all amide linkages, is coated on wire and baked, the reaction described in step 4 takes place, liberating phenol to permit imidization and the formation of a flexible, high temperature resistant wire enamel.

Figure 2:
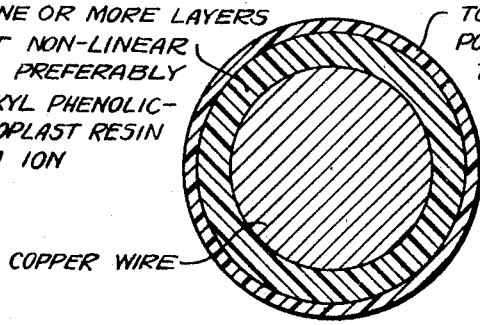

The #18 AWG copper wire basecoated with 2½ mils in five layers with the basecoat enamels of Examples IV and VI are topcoated to a total coating build of 3 mils with a single ½ mil coating of the topcoat enamel of Example VII using the same wire speed and tower noted hereinbefore to provide good resistance to heat shock, and good hydrolytic stability, and good resistance to Freon. Curiously, the topcoat not only served to enhance properties as noted above, but in combination with the basecoat of Example IV, a marked increase in the "variable pressure cut through resistance" is obtained which seems to be unique for a comparable improvement using the topcoat of this invention with other basecoats is not obtained and, similarly, other conventional topcoats do not serve to markedly improve "variable pressure cut through resistance." The coated wire of the invention is diagrammatically illustrated in FIG. 2.

The invention is not to be construed by any abstract of disclosure, but its features are instead characterized in the description given hereinbefore.

I claim:

1. A metal conductor provided with an electrically insulating coating comprising at least one basecoat layer comprising thermoset nonlinear copolyester consisting essentially of a dicarboxylic acid component, an aliphatic diol component containing from 2–10 carbon atoms and a polyhydric alcohol component containing at least 3 hydroxy groups per molecule, the proportions of said components in the copolyester falling within the closed area A–B–C–D–E–F–A in the accompanying triangulation, and superimposed thereon an outer insulating layer imparting hydrolytic stabiilty and Freon resistance, said outer insulating layer being a baked film of organic solvent-soluble polyamide polymer of trimellitic anhydride and organic polyisocyanate in mol proportions of from 1/0.95 to 1/1.4.

2. A conductor as recited in claim 1 in which said dicarboxylic acid component is selected from the group consisting of terephthalic acid, isophthalic acid, benzophenone dicarboxylic acid, dicarboxylic acid diimides, and mixtures thereof.

3. A conductor as recited in claim 1 in which said diol is ethylene glycol.

4. A conductor as recited in claim 1 in which said polyhydric alcohol component comprises trishydroxyalkyl isocyanurate.

5. A conductor as recited in claim 1 in which the proportions of said copolyester components are defined by the closed area G–H–I–E–G in the accompanying triangulation.

6. A conductor as recited in claim 1 in which said polyisocyanate is an aromatic diisocyanate.

7. A conductor as recited in claim 1 in which said polyisocyanate is methylene diisocyanate.

8. A conductor as recited in claim 2 in which said basecoat comprises said copolyester thermoset in the presence of alkyl phenolic-modified, organic solvent-soluble heat-hardening aminoplast resin and dissolved titanium ion.

9. A conductor as recited in claim 8 in which said modified aminoplast resin is based on methyl-substituted phenol and is present in an amount based on unreacted amino-plast, of about 2–25% of the weight of the copolyester and said titanium ion is present in an amount of at least about 0.1% of the weight of the copolyester.

10. A metal conductor provided with an electrically insulating coating comprising a plurality of basecoat layers each comprising nonlinear acid-terminated copolyester consisting essentially of a dicarboxylic acid component selected from the group consisting of terephthalic acid, isophthalic acid, benzophenone dicarboxylic acid, dicarboxylic acid diimides, and mixtures thereof, an aliphatic diol component of straight chain diols having from 2–5 carbon atoms and two primary hydroxy groups, and a polyhydric alcohol component containing 3 hydroxy groups per molecule, the proportions of said components in the copolyester falling within the closed area A–B–C–D–E–F–A in the accompanying triangulation, said copolyester being thermoset in the presence of alkyl phenolic-modified, organic solvent-soluble, heat-hardening aminoplast resin and dissolved titanium ion, and superimposed thereon an outer insulating layer imparting hydrolytic stability and Freon resistance, said outer insulating layer being a baked film of organic solvent-soluble polyamide polymer of trimellitic anhydride and organic polyisocyanate in mol proportions of from 1/0.95 to 1/1.4.

11. A conductor as recited in claim 10 in which said copolyester is thermoset in the presence of methyl substituted phenol-modified melamine-formaldehyde condensate and said titanium ion is present in the form of titanium cresylate.

12. A conductor as recited in claim 10 in which said said dicarboxylic acid is a diimide formed by reacting two mols of trimellitic anhydride with one mol of methylene dianiline.

13. A conductor as recited in claim 10 in which said dicarboxylic acid is a diimide formed by reacting aromatic dianhydride with monoamino monocarboxylic acid in a mol ratio of substantially 1:2.

14. A conductor as recited in claim 10 in which said polyhydric alcohol comprises tris hydroxyalkyl isocyanurate and the proportions of said copolyester are defined by the closed area G–H–I–E–G in the accompanying triangulation.

References Cited

UNITED STATES PATENTS

| | | | |
|---|---|---|---|
| 3,022,200 | 2/1962 | Koerner et al. | 117—218 |
| 3,190,770 | 6/1965 | Lavin et al. | 117—218 |
| 3,306,771 | 2/1967 | Schmidt et al. | 117—218 |
| 3,361,593 | 1/1968 | Sattler et al. | 117—218 |
| 3,390,118 | 6/1968 | Bach et al. | 117—75 X |
| 3,428,486 | 2/1969 | George | 117—218 |

WILLIAM D. MARTIN, Primary Examiner

R. HUSACK, Assistant Examiner

U.S. Cl. X.R.

117—75, 128.4, 161, 232; 260—33.4, 75, 78

UNITED STATES PATENT OFFICE
CERTIFICATE OF CORRECTION

Patent No. 3,475,212　　　　　　　　　　　　　　　　October 28, 1969

Henry J. Bach

It is certified that error appears in the above identified patent and that said Letters Patent are hereby corrected as shown below:

Column 1, line 31, "containg" should read -- coating --. Column 3, line 68, "1-5 carbon atoms" should read -- 2-5 carbon atoms --. Column 5, line 31, "tetrachloroethane" should read -- tetrachlorethane --; line 44, "substracting" should read -- subtracting --. Column 6, line 75, "end" should read -- and --. Column 8, line 6, "a", second occurrence, should read -- an --. Column 9, line 27, "of 95.3-97.8%" should read -- or 95.3-97.8% --. Column 10, lines 45 to 62, in the second formula,

　　　　　should read　　　　　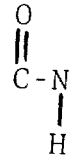

Column 10, line 64, "possess" should read -- possesses --; line 66, "in 1" should read -- in step 1 --. Column 11, line 15, "agent" should read -- agents --. Column 14, line 28, "said said" should read -- said --.

Signed and sealed this 16th day of June 1970.

(SEAL)
Attest:

EDWARD M. FLETCHER, JR.
Attesting Officer

WILLIAM E. SCHUYLER, JR.
Commissioner of Patents